United States Patent
Bräckelmann et al.

[11] Patent Number: 6,098,645
[45] Date of Patent: Aug. 8, 2000

[54] LEAK RESISTANT, SWITCHING, DOUBLE VALVE SYSTEM

[75] Inventors: Wolfgang Bräckelmann, Unna-Uelzen; Klaus Scholz, Dortmund; Norbert Fischer, Ennigerloh, all of Germany

[73] Assignee: APV Rosista GmbH, Unna, Germany

[21] Appl. No.: 09/078,985

[22] Filed: May 14, 1998

[30] Foreign Application Priority Data

May 16, 1997 [DE] Germany .......................... 197 20 566

[51] Int. Cl.$^7$ .................................. B08B 3/02; B08B 9/02
[52] U.S. Cl. ........................... 137/15; 137/240; 137/312; 137/614.17; 137/614.19
[58] Field of Search ..................... 137/15, 312, 315, 137/240, 614.17, 614.18, 614.19

[56] References Cited

U.S. PATENT DOCUMENTS

| | | | |
|---|---|---|---|
| 4,304,251 | 12/1981 | Schadel et al. | 137/240 |
| 4,360,039 | 11/1982 | Jeppsson | 137/240 |
| 4,373,545 | 2/1983 | Knappe | 137/312 |
| 4,460,014 | 7/1984 | Mases et al. | 137/240 |
| 4,552,167 | 11/1985 | Brakelmann | 137/240 |
| 4,605,035 | 8/1986 | Rasmussen et al. | 137/240 |
| 4,617,955 | 10/1986 | Melgaard | 137/240 |
| 4,655,253 | 4/1987 | Ourensma | 137/240 |
| 4,687,015 | 8/1987 | Mieth | 137/240 |
| 4,757,834 | 7/1988 | Mieth | 137/240 |
| 4,856,551 | 8/1989 | Brakelmann | 137/240 |
| 4,995,416 | 2/1991 | Mieth | 137/312 |
| 5,085,241 | 2/1992 | Mieth | 137/240 |
| 5,575,305 | 11/1996 | Mieth | 137/240 |
| 5,645,102 | 7/1997 | Brackelmann et al. | 137/240 |
| 5,699,825 | 12/1997 | Norton | 137/312 |
| 5,806,554 | 9/1998 | Mieth | 137/240 |

FOREIGN PATENT DOCUMENTS

0140432  1/1991  European Pat. Off. .

Primary Examiner—George L. Walton
Attorney, Agent, or Firm—Nils H. Ljungman & Associates

[57] ABSTRACT

A double-seat valve with an upper valve stem and a lower valve stem which, on the end, each have valve sealing bodies, each of which valve sealing bodies has a seal which is located on the balance diameter. One of the valve sealing bodies also has a center seal which is used to seal a leakage space when the valve stems are in the open position. The center seal also lies on the balance diameter. The other valve sealing body has a sealing collar, against which sealing collar the center seal is in contact when the valve stems are in the open position, so that even in this case, a sealing of the leakage space is guaranteed.

20 Claims, 3 Drawing Sheets

LEAK RESISTANT, SWITCHING, DOUBLE VALVE SYSTEM

BACKGROUND OF THE INVENTION

1. Field of the Invention

The present invention relates to a double-seat valve with an upper valve stem and a lower valve stem in a valve housing. The double seat valve also has pipeline connections located one above the other and a valve sealing or mating seat located between the upper pipeline connections and the lower pipeline connections for the valve stems. The valve stems can be actuated independently of one another and can be moved onto a balance diameter in the valve housing. The valve stems, which are equipped on the ends with valve sealing or mating bodies corresponding to one another, form a leakage space which is open on the bottom, and the valve sealing bodies are each surrounded by at least one seal. Each at least one seal is in contact on the balance diameter against the valve sealing seat, and one of the valve sealing bodies has a center seal against which the other valve sealing body is in contact when the valve stems are moved toward one another in the open position. In the context of this invention, the term "balance diameters" means that the valve stems and the valve sealing bodies are each guided on identical diameters or almost identical diameters, maintaining a fitting gap in the valve housing.

2. Background Information

A known double-seat valve is described in European Patent No. 0 140 432, for example, in which the center seal is located on the plate-like valve sealing body of the lower valve stem. This device describes a significantly smaller diameter than the balance diameter, on which the seals which surround the upper valve sealing body and the lower valve sealing body are located. Such an arrangement of the center seal is problematic, in particular if the two valve stems or their valve sealing bodies are in the open position, and thus the upper pipeline connections are in communication with the lower pipeline connections via the open valve sealing seat. When the valve stems are in the open position and the valve sealing bodies are moved toward one another, the leakage space must be closed with respect to the communicating pipeline connections and the medium being transported in them. If, however, a pressure fluctuation or pressure hammer which is propagated via the medium occurs when the valve components are in this position, there is a danger that the upper valve stem and the lower valve stem and/or their valve sealing bodies will be pushed together as a result of the incorrectly balanced center seal, and medium will flow downward via the leakage space.

A further problem can be seen in the fact that the known double seat valve must be completely disassembled when it becomes necessary to replace the seal. That is because, despite the fact that the valve stems with the valve sealing bodies can be removed from the valve housing, the center seal, because its diameter is very much smaller than the balance diameter, cannot be extracted over the lower or upper valve stems or their valve sealing bodies, and a new center seal pulled on, because the seals used do not have the required elasticity. In addition, the center seal is not accessible without disassembling the valve sealing bodies in question.

The present invention proposes to solve these problems.

OBJECT OF THE INVENTION

The object of the present invention is to create a double-seat valve of the type described above which is characterized by a resistance to pressure fluctuations in the open position, and by a seal replacement process which does not require complete disassembly of the valve.

SUMMARY OF THE INVENTION

The present invention teaches that this object can be accomplished on a generic double-seat valve in that the center seal, like the other two seals, also lies on the balance diameter, and that the other valve sealing bodies can have a sealing collar, against which the center seal is in contact when the valve stems are in the open position with a sealing action. The present invention is based on the knowledge that the center seal can also be located on the balance diameter, if steps are taken to ensure a correct sealing of the valve sealing bodies with respect to one another. This correct sealing can be essentially guaranteed if the valve stems are in the open position. In the context of the present invention, this situation can be accomplished by means of the sealing collar on the particular valve sealing body which corresponds to the valve sealing body with the center seal on the balance diameter. As a result of the fact that the center seal is on the balance diameter, there is no longer any danger that the valve sealing bodies will open as a result of a pressure fluctuation transmitted by the medium flowing through the respective pipeline connections, which can conventionally be up to 50 Bar. In fact, the correct sealing action between the valve sealing bodies and their valve stems is essentially guaranteed in their open position, so that no medium can penetrate into the leakage space and flow out in an uncontrolled manner.

Also of particular importance is the fact that all of the seals are located on the same diameter, namely the balance diameter. In the double-seat valve of the present invention, this diameter is identical to the outside diameter of the valve sealing bodies, so that it is also easily possible, with respect to the center seal, to change a seal without having to disassemble the double-seat valve. All that is necessary for the replacement of the center seal is to extract the valve stems with their valve sealing bodies from the valve housing. Finally, relatively large seal gaps between the valve stems or their valve sealing bodies and the valve sealing seat can be realized, taking into consideration the seals located on the outside periphery of the valve sealing bodies, so that to this extent, optimal accessibility for a cleaning fluid is guaranteed.

Additional characterizing features of the invention are explained below. For example, the invention teaches that the valve sealing seat can have an indentation or depression corresponding to the center seal in its contact surface, and when the valve stems are in the closed position, the indentation is in communication with the leakage space. In this manner, therefore, it is possible to perform a proper cleaning, using cleaning fluid, not only of the leakage space, but also to clean the center seal and the corresponding indentation in the valve seal seat out to the two outer seals. The seals are preferably realized in the form of annular seals or gaskets with a rounded contact profile on the outside, and a bilateral anchoring shoulder on the inside. In this manner, on one hand a correct sealing action is achieved, if the valve stems or their valve sealing bodies are in the closed position, and on the other hand, the annular seals are anchored in the valve sealing bodies, which guarantees a secure fastening of the annular seals, as well as their removal during the process of replacing a seal. The center seal can be appropriately located on the valve sealing body of the upper valve stem, although the reverse arrangement is also conceivable in another embodiment of the present invention.

The present invention also teaches that an injection tube for a cleaning fluid can be attached to the inside of the valve housing, and the injection tube projects into the lower valve stem, which is open on the bottom, and is directed toward the upper valve sealing body which is realized in the form of a plate. Consequently cleaning agent can be guided in a tight or focused jet toward the upper valve sealing body, which cleaning agent, as a result of the plate-like realization of the upper sealing body, is fanned outward in the vicinity of the valve sealing seat. The injection tube, which can be detachably installed in the valve housing, is advantageous from a manufacturing and assembly point of view, because there is no connection to the valve sealing seat, and consequently the injection tube can be easily removed and even replaced.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater below with reference to the exemplary embodiment which is illustrated in the accompanying drawings, wherein.

DESCRIPTION OF THE PREFERRED EMBODIMENT

Figure 1:
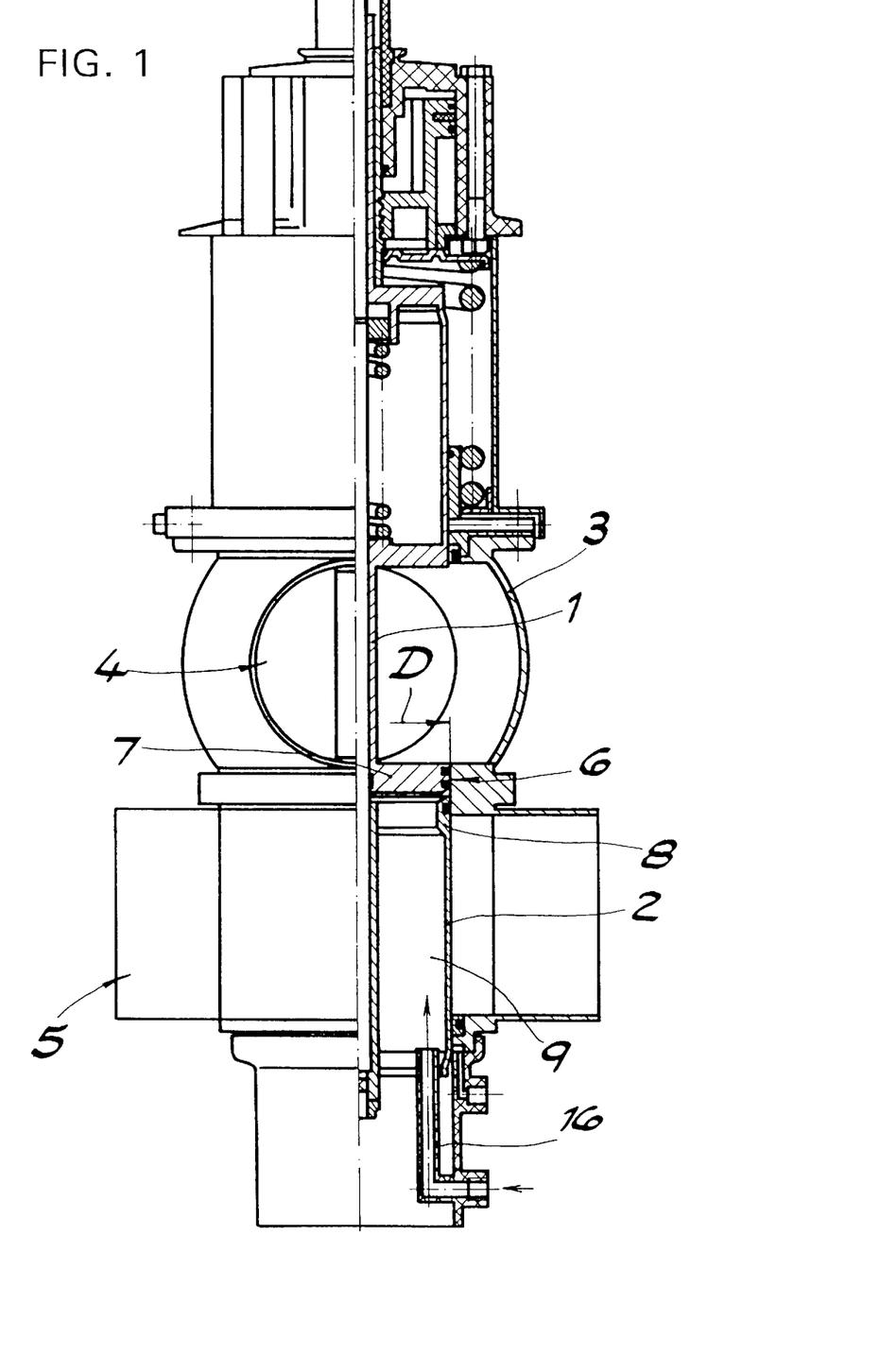
FIG. 1 shows a double-seat valve as claimed by the invention in a schematic view in partial section.

The accompanying drawings illustrate an embodiment of a double-seat valve which, in its basic construction, has an upper valve stem 1 and a lower valve stem 2 in a valve housing 3, as shown in FIG. 1. The double-seat valve additionally includes pipeline connections 4, 5 located one above the other, and a valve sealing seat 6 located between the upper pipeline connections 4 and the lower pipeline connections 5 for the valve stems 1, 2. The valve stems 1, 2 can be actuated independently of one another, and can be moved onto a balance diameter D in the valve housing 3. The valve stems 1, 2 which are equipped with valve sealing bodies 7, 8 on their ends facing one another, form a leakage space 9 which is open on the bottom. The valve sealing bodies 7, 8 are each surrounded by at least one seal 10 which is/are in contact on the balance diameter D against the valve sealing seat 6 (see FIG. 2). One of the valve sealing bodies 7 has a center seal 11, against which the other valve sealing body 8 is in contact when the valve stems 1, 2 are moved toward one another in the open position (see FIG. 5). This center seal 11, like the other two seals, is also on the balance diameter D. The other valve sealing body 8 has a sealing collar 12, against which the center seal 11 is in contact with a sealing action when the valve stems 1, 2 are in the open position, so that the leakage chamber 9 is then closed with respect to the medium flowing through the communicating pipeline connections 4, 5. The valve sealing seat 6 has, in its contact surface, an indentation 13 which corresponds to the center seal 11. When the valve stems 1, 2 are in the closed position, the indentation 13 is in communication with the leakage space 9, i.e. when the leakage space 9 is being cleaned, the indentation 13 is cleaned as well as the center seal 11. The seals 10, 11 are realized in the form of annular seals which have a rounded contact profile on the outside and a bilateral anchoring shoulder 14 on the inside which is inserted into corresponding ring-shaped grooves 15 on the outside periphery of the valve sealing bodies 7, 8. In this particular embodiment, the center seal 11 is located on the valve sealing body 7 of the upper valve stem 1, because this valve sealing body is realized in the form of a plate.

Attached to the inside of the valve housing 3, there is also a removable and replaceable injection tube 16 for a cleaning medium (see FIG. 1). The injection tube 16 projects into the lower valve stem 2 which lower valve stem 2 is open on the bottom, and is oriented toward the plate-shaped upper valve sealing body 7. If the cleaning jet is made to impact off-center, the result is a rotational flow in the valve sealing seat 6 between the two seals 10 and 11.

Figure 2:
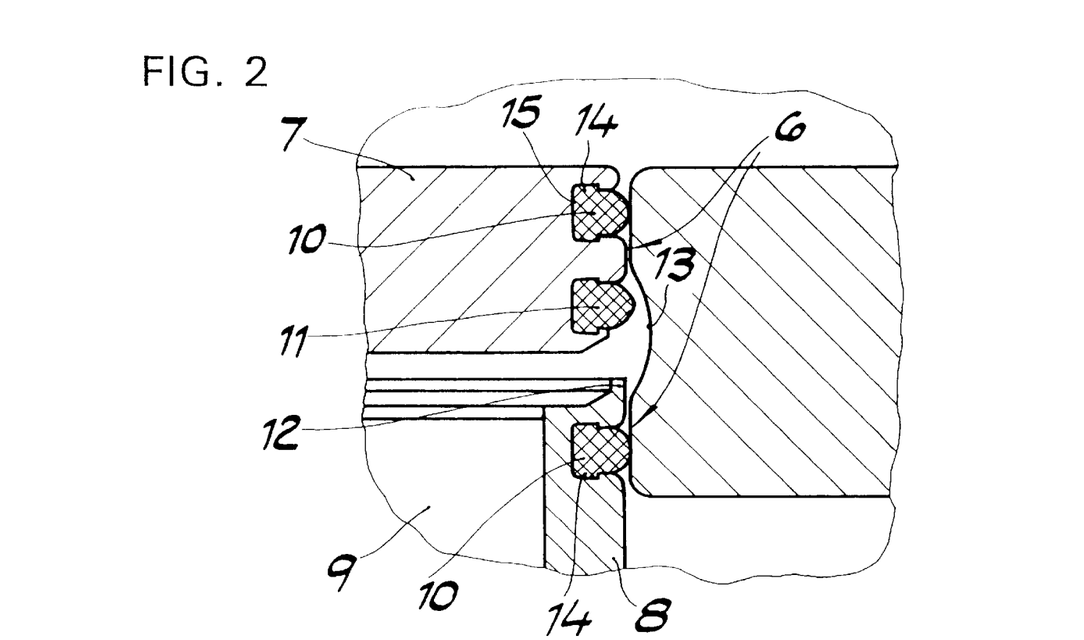
FIG. 2 shows an enlarged section of the valve illustrated in FIG. 1 in the vicinity of the valve sealing seat, with the valve stems in the closed position.
Figure 5:
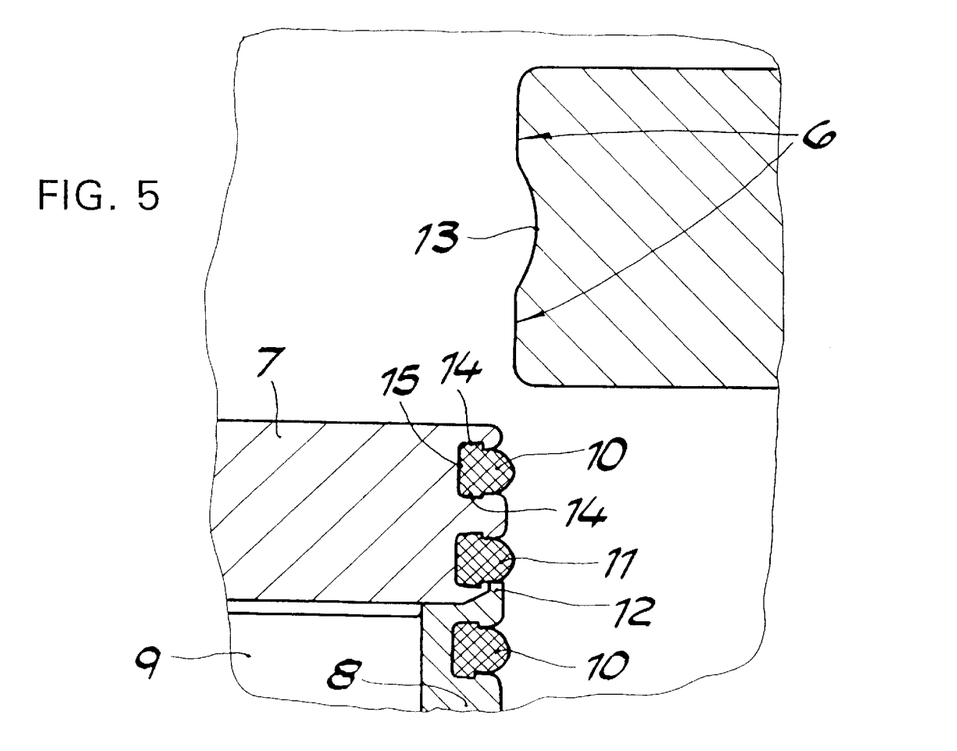
FIG. 5 shows the valve illustrated in FIG. 2 with the valve stems in the open position, and the resulting closed leakage space.

When the valve stems 1, 2 illustrated in FIG. 2 are in the closed position, the media in the upper pipeline connections 4 and the lower pipeline connections 5 are separated from one another, to that extent, the media in question can be different. When the valve stems 1, 2 illustrated in FIG. 5 are in the open position, the pipeline connections 4 and 5 are in communication with one another, and can consequently be flowed through by only a single medium, while the leakage space 9, on the other hand, remains closed.

In other words and in accordance with at least one embodiment of the present invention, when the valve stems are in the open position the pipeline connections 4, 5 are open to one another and the leakage space 9 is closed from the pipeline connections 4, 5. In this embodiment, only one medium can be present in the pipeline connections 4, 5 since the pipeline connections 4, 5 are open to one another.

Figure 3:
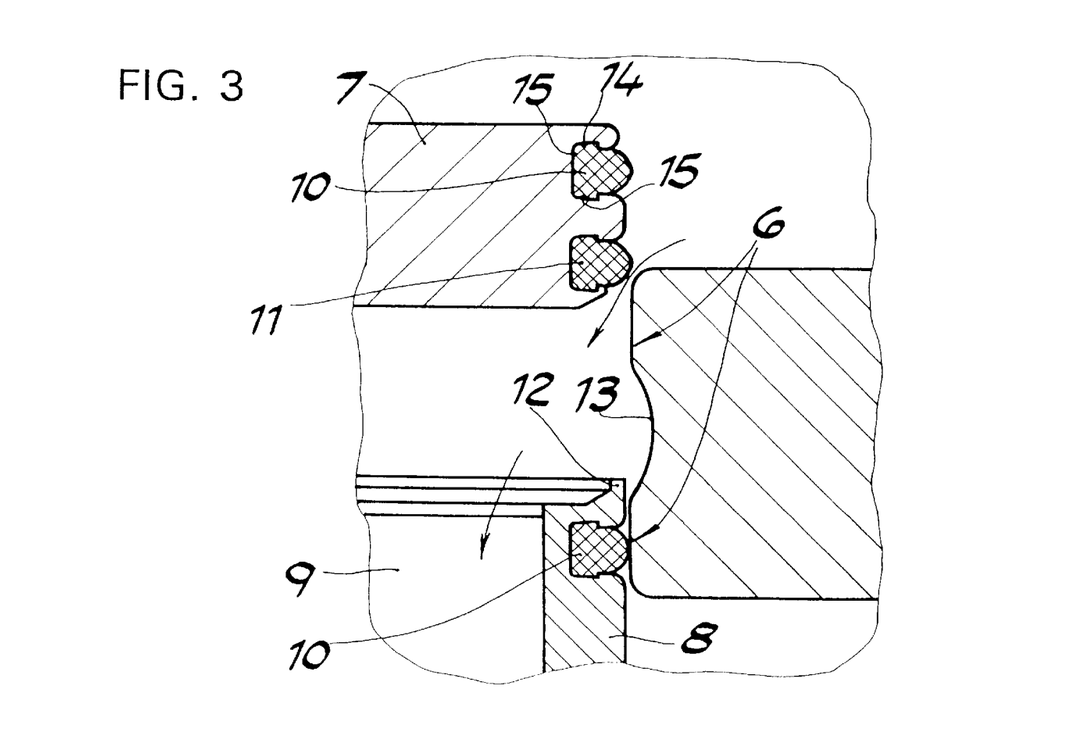
FIG. 3 shows the valve illustrated in FIG. 2 with the upper valve stem raised to clean the upper portion of the valve.

During the cleaning of the upper portion of the valve as illustrated in FIG. 3, the upper pipeline connections 4 can carry the flow of a cleaning agent which is discharged by means of the leakage space 9, while the lower pipeline connections 5 can carry the flow of a medium, because the lower pipeline connections 5 are sealed off from the leakage space 9 and from the upper pipeline connections 4.

Figure 4:
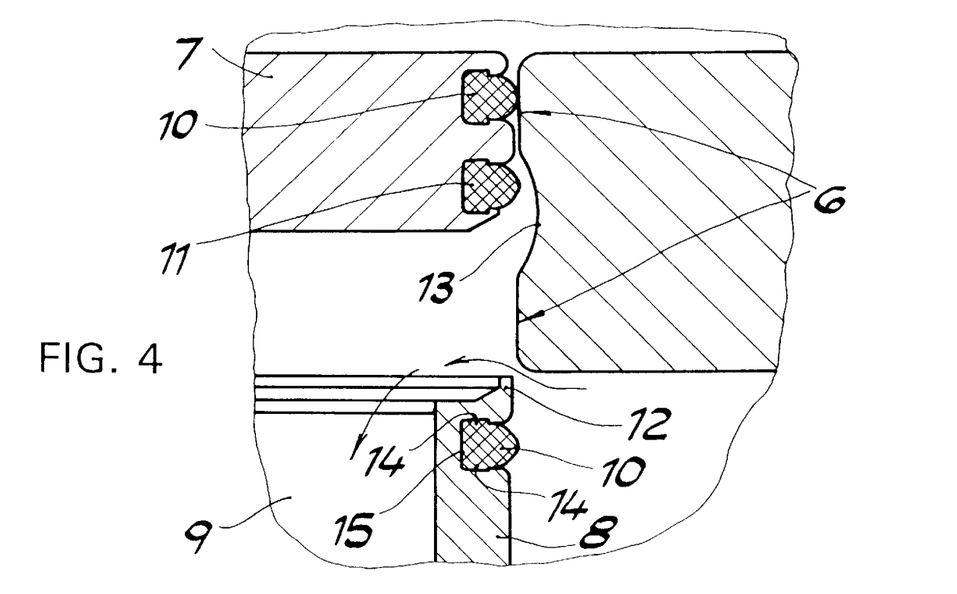
FIG. 4 shows a section of the valve illustrated in FIG. 2 with the lower valve stem lowered to clean the lower portion of the valve.

The cleaning of the lower portion of the valve is performed in the reverse manner. In this case, the lower valve stem 2 is moved downward. Once the valve sealing body 8 of the lower valve stem 2 has left the valve sealing seat 6, the lower pipeline connections 5 can carry a flow of cleaning fluid, which flow of cleaning fluid is discharged unpressurized downward via the leakage space 9. At the same time, the upper pipeline connections 4 can carry the flow of a medium, because these pipeline connections 4 are sealed off from the leakage space 9 and the lower pipeline connections 5 by the upper valve sealing body 7 (FIG. 4).

One feature of the invention resides broadly in the double-seat valve with an upper valve stem and a lower valve stem in a valve housing, with pipeline connections located one above the other and a valve sealing seat located between the upper pipeline connections and the lower pipeline connections for the valve stems which can be actuated independently of one another and can be moved onto a balance diameter in the valve housing, whereby the valve stems which are equipped on the ends with valve sealing or mating bodies corresponding to one another form a leakage space which is open on the bottom, and the valve sealing bodies are each surrounded by at least one seal which is in contact on the balance diameter against the valve sealing seat, and one of the valve sealing bodies has a center seal, against which the other valve sealing body is in contact when the valve stems are moved toward one another in the open position, characterized by the fact that the center seal 11 lies on the balance diameter D, and that the other valve sealing body 8 has a sealing collar 12, against which the center seal 11 is in contact when the valve stems 1, 2 are in the open position.

Another feature of the invention resides broadly in the double-seat valve characterized by the fact that the valve sealing seat 6 has an indentation 13 in the contact surface corresponding to the center seal 11, and the indentation 13 is in communication with the leakage space when the valve stems 1, 2 are in the closed position.

Yet another feature of the invention resides broadly in the double-seat valve characterized by the fact that the seals 10, 11 are realized in the form of annular seals or gaskets which seals have a rounded contact profile on the outside, and a bilateral anchoring shoulder 13 on the inside.

Still another feature of the invention resides broadly in the double-seat valve characterized by the fact that the center seal 11 is located on the valve sealing body 7 of the upper valve stem 1.

A further feature of the invention resides broadly in the double-seat valve characterized by the fact that attached to the inside of the valve housing 3 is an injection tube 16 for a cleaning fluid, and the injection tube 16 projects into the lower valve stem 2 and is oriented toward the upper valve sealing body 7 which is realized in the form of a plate.

Another feature of the invention resides broadly in the double-seat valve characterized by the fact that when the jet of cleaning fluid exiting the injection tube 16 impacts off-center, the result is a rotational flow in the valve sealing seat 6 between the two seals 10, 11.

Still another feature of the invention resides broadly in a double valve, the valve comprising: a valve housing; a first valve body disposed within the valve housing; the first valve body comprising at least one first seal; the first valve body comprising at least one first groove, the at least one groove being configured to receive the at least one first seal; the at least one first seal being disposed in the at least one first groove; a second valve body disposed within the valve housing; the second valve body comprising at least one second seal; the second valve body comprising at least one second groove, the at least one second groove being configured to receive the at least one second seal; the at least one second seal being disposed in the at least one second groove; the first valve body and the second valve body being slidably displaceable; the first valve body and the second valve body being slidably displaceable to provide a closed position and an open position of the valve; a first valve seat disposed within the valve housing; the first valve body being disposed to be in contact with the first valve seat in the closed position; a second valve seat disposed within the valve housing; the second valve body being disposed to be in contact with the second valve seat in the closed position; the first valve body being slidably displaceable between the open position and a first flushing position to flush the first valve body; the second valve body being slidably displaceable between the closed position and the open position; the second valve body having a second flushing position to flush the second valve body; at least one input and at least one output; the first valve body and the first valve seat and the second valve body and the second valve seat being disposed between the at least one input and the at least one output to permit flow and stop flow between the at least one input and the at least one output; a cavity disposed within the housing; the cavity being disposed adjacent to the first valve body and adjacent to the second valve body to allow exit of fluid upon the valve being in the first flushing position or the second flushing position; apparatus to move said first and second valve bodies, the apparatus being configured: to move the first valve body and the second valve body in a first direction of movement from the closed position to the open position; to move the first valve body in a second direction of movement from the closed position to the first flushing position thus freeing the first valve body from the first valve seat, the second direction of movement being opposite to the first direction of movement; and to move the second valve body in a third direction of movement from the closed position to the second flushing position thus freeing the second valve body from the second valve seat, the third direction of movement being opposite to the second direction of movement; the at least one first seal having a first diameter and the at least one second seal having a second diameter; and the first diameter being substantially equal to the second diameter.

A further feature of the invention resides broadly in a method of replacing the seals in a double valve, the valve comprising: a valve housing; a first valve body disposed within the valve housing; the first valve body comprising at least one first seal; the first valve body comprising at least one first groove, the at least one groove being configured to receive the at least one first seal; the at least one first seal being disposed in the at least one first groove; a second valve body disposed within the valve housing; the second valve body comprising at least one second seal; the second valve body comprising at least one second groove, the at least one second groove being configured to receive the at least one second seal; the at least one second seal being disposed in the at least one second groove; the first valve body and the second valve body being slidably displaceable; the first valve body and the second valve body being slidably displaceable to provide a closed position and an open position of the valve; a first valve seat disposed within the valve housing; the first valve body being disposed to be in contact with the first valve seat in the closed position; a second valve seat disposed within the valve housing; the second valve body being disposed to be in contact with the second valve seat in the closed position; the first valve body being slidably displaceable between the open position and a first flushing position to flush the first valve body; the second valve body being slidably displaceable between the closed position and the open position; the second valve body having a second flushing position to flush the second valve body; at least one input and at least one output; the first valve body and the first valve seat and the second valve body and the second valve seat being disposed between the at least one input and the at least one output to permit flow and stop flow between the at least one input and the at least one output; a cavity disposed within the housing; the cavity being disposed adjacent to the first valve body and adjacent to the second valve body to allow exit of fluid upon the valve being in the first flushing position or the second flushing position; apparatus to move said first and second valve bodies, the apparatus being configured: to move the first valve body and the second valve body in a first direction of movement from the closed position to the open position; to move the first valve body in a second direction of movement from the closed position to the first flushing position thus freeing the first valve body from the first valve seat, the second direction of movement being opposite to the first direction of movement; and to move the second valve body in a third direction of movement from the closed position to the second flushing position thus freeing the second valve body from the second valve seat, the third direction of movement being opposite to the second direction of movement; the at least one first seal having a first diameter and the at least one second seal having a second diameter; and the first diameter being substantially equal to the second diameter; said method comprising the steps of: extracting the first valve body from the valve; stretching the at least one first seal to a greater diameter than the first diameter; sliding the at least one first seal off of the first valve body; providing at least one replacement first seal for the at least one first seal; stretching the at least one first replacement seal to a greater diameter than the first diameter; and sliding the at least one first replacement seal onto the first valve body.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 197 20 566.6-12, filed on Apr. 16, 1997, having inventors Wolfgang Brackelmann, Klaus Scholz, and Norbert Fischer, and DE-OS 197 20 566.6-12 and DE-PS 197 20 566.6-12, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

U.S. Pat. No. 5,645,102, issued on Jul. 8, 1997, is hereby expressly incorporated by reference as if set forth in its entirety herein.

The following U.S. Patents may include valves or components of valves which may be incorporated in the present invention: No. 4,304,251 issued December, 1981; No. 4,360,039, issued November 1982; No. 4,368,753, issued January 1993; No. 4,460,014, issued July 1984; No. 4,605,035, issued August 1986; No. 4,617,955, issued October 1986; No. 4,655,253, issued April, 1987; No. 4,687,015, issued August 1987; No. 4,757,834, issued July 1988; No. 4,856,551, issued August 1989.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A double valve, said valve comprising:

a valve housing;

a first valve body disposed within said valve housing;

said first valve body comprising at least one first seal;

said first valve body comprising at least one first groove, said at least one groove being configured to receive said at least one first seal;

said at least one first seal being disposed in said at least one first groove;

a second valve body disposed within said valve housing;

said second valve body comprising at least one second seal;

said second valve body comprising at least one second groove, said at least one second groove being configured to receive said at least one second seal;

said at least one second seal being disposed in said at least one second groove;

said first valve body and said second valve body being slidably displaceable;

said first valve body and said second valve body being slidably displaceable to provide a closed position and an open position of said valve;

a first valve seat disposed within said valve housing;

said first valve body being disposed to be in contact with said first valve seat in said closed position;

a second valve seat disposed within said valve housing;

said second valve body being disposed to be in contact with said second valve seat in said closed position;

said first valve body having a first flushing position to flush said first valve body;

said first valve body being slidably displaceable between said open position and said first flushing position to flush said first valve body;

said second valve body being slidably displaceable between said closed position and said open position;

said second valve body having a second flushing position to flush said second valve body;

at least one input and at least one output;

said first valve body and said first valve seat and said second valve body and said second valve seat being disposed between said at least one input and said at least one output for permitting flow and stopping flow between said at least one input and said at least one output;

a cavity disposed within said housing;

said cavity being disposed adjacent to said first valve body and adjacent to said second valve body to allow exit of fluid upon the valve being in said first flushing position or said second flushing position;

apparatus to move said first and second valve bodies being configured:

to move said first valve body and said second valve body in a first direction of movement from said closed position to said open position;

to move said first valve body in a second direction of movement from said closed position to said first flushing position thus freeing said first valve body from said first valve seat, said second direction of movement being substantially opposite to said first direction of movement; and to move said second valve body in a third direction of movement from said closed position to said second flushing position thus freeing said second valve body from said second valve seat, said third direction of movement being opposite to said second direction of movement;

said at least one first seal having a first diameter and said at least one second seal having a second diameter; and the first diameter being substantially equal to the second diameter.

2. The valve according to claim 1 wherein:

one of said first valve body and said second valve body comprises a third seal;

the other of said first valve body and said second valve body comprises a sealing collar; and said third seal is disposed and configured to be in contact with said sealing collar and to seal said cavity when said valve is in said open position.

3. The valve according to claim 2 wherein said third seal is disposed between said at least one first seal and said at least one second seal.

4. The valve according to claim 3 wherein:

said third seal has a third diameter; and the third diameter is substantially equal to both the first diameter and the second diameter.

5. The valve according to claim 4 comprising:

a first valve stem corresponding to said first valve body; and a second valve stem corresponding to said second valve body.

6. The valve according to claim 5 wherein said first and second valve seats comprise a one-piece valve seat.

7. The valve according to claim 6 wherein:

said one-piece valve seat comprises an indentation; and said indentation is disposed between said first valve seat and said second valve seat to correspond to said third seal upon the valve being in said closed position.

8. The valve according to claim 7 wherein said indentation is configured and disposed to be in fluid communication with said cavity upon the valve being in said closed position.

9. The valve according to claim 8 wherein:

said at least one first seal, said at least one second seal and said third seal each comprise annular gaskets;

said annular gaskets each comprise a rounded profile, said rounded profile being disposed toward said one-piece valve seat; and each said annular gasket comprises an anchoring shoulder disposed toward its corresponding valve body.

10. The valve according to claim 9 wherein said third seal is disposed on said first valve body.

11. The valve according to claim 10 wherein said first valve body is disposed above said second valve body.

12. The valve according to claim 11 comprising:

an injection tube;

said injection tube being disposed within said housing; and said injection tube being disposed and configured to supply a cleaning fluid to the valve.

13. The valve according to claim 12 wherein:

said injection tube is disposed adjacent said lower valve stem;

said injection tube is disposed to provide cleaning fluid toward said first valve body;

said first valve body comprises a plate; and said injection tube is configured and disposed to provide a rotational flow of cleaning fluid adjacent said one-piece valve seat and between said at least one first seal and said at least one second seal.

14. A method of replacing the seals in a double valve, the valve comprising: a valve housing; a first valve body disposed within the valve housing; the first valve body comprising at least one first seal; the first valve body comprising at least one first groove, the at least one groove being configured to receive the at least one first seal; the at least one first seal being disposed in the at least one first groove; a second valve body disposed within the valve housing; the second valve body comprising at least one second seal; the second valve body comprising at least one second groove, the at least one second groove being configured to receive the at least one second seal; the at least one second seal being disposed in the at least one second groove; the first valve body and the second valve body being slidably displaceable; the first valve body and the second valve body being slidably displaceable to provide a closed position and an open position of the valve; a first valve seat disposed within the valve housing; the first valve body being disposed to be in contact with the first valve seat in the closed position; a second valve seat disposed within the valve housing; the second valve body being disposed to be in contact with the second valve seat in the closed position; the first valve body having a first flushing position to flush said first valve body; the first valve body being slidably displaceable between the open position and the first flushing position to flush the first valve body; the second valve body being slidably displaceable between the closed position and the open position; the second valve body having a second flushing position to flush the second valve body; at least one input and at least one output; the first valve body and the first valve seat and the second valve body and the second valve seat being disposed between the at least one input and the at least one output to permit flow and stop flow between the at least one input and the at least one output; a cavity disposed within the housing; the cavity being disposed adjacent to the first valve body and adjacent to the second valve body to allow exit of fluid upon the first valve body being in the first flushing position or the second valve body being in the second flushing position; apparatus to move said first and second valve bodies, the apparatus being configured: to move the first valve body and the second valve body in a first direction of movement from the closed position to the open position; to move the first valve body in a second direction of movement from the closed position to the first flushing position thus freeing the first valve body from the first valve seat, the second direction of movement being opposite to the first direction of movement; and to move the second valve body in a third direction of movement from the closed position to the second flushing position thus freeing the second valve body from the second valve seat, the third direction of movement being opposite to the second direction of movement; the at least one first seal having a first diameter and the at least one second seal having a second diameter; and the first diameter being substantially equal to the second diameter; said method comprising the steps of:

extracting the first valve body from the valve housing;
  stretching the at least one first seal to a greater diameter than the first diameter;
  sliding the at least one first seal off of the first valve body;
  providing at least one replacement first seal for the at least one first seal;
  stretching the at least one replacement first seal to a greater diameter than the first diameter; and
  sliding the at least one replacement first seal onto the first valve body.

15. The method according to claim 14 comprising the steps of:

extracting the second valve body from the valve housing;
  stretching the at least one second seal to a greater diameter than the second diameter;
  sliding the at least one second seal off of the second valve body;
  providing at least one replacement second seal for the at least one second seal;
  stretching the at least one replacement second seal to a greater diameter than the second diameter; and
  sliding the at least one replacement second seal onto the second valve body.

16. The method according to claim 15 wherein the first valve body comprises a third seal; the second valve body comprises a sealing collar; the third seal is disposed and configured to be in contact with the sealing collar and to seal the cavity when the valve is in the open position; the third seal is disposed between the at least one first seal and the at least one second seal; the third seal has a third diameter; and the third diameter is substantially equal to both the first diameter and the second diameter.

17. The method according to claim 16 comprising the steps of:

stretching the third seal to a greater diameter than the third diameter;
  sliding the third seal off of the first valve body;
  providing a replacement third seal for the third seal;
  stretching the replacement third seal to a greater diameter than the second diameter; and
  sliding the replacement thirdseal onto the first valve body.

18. The method according to claim 17 wherein: the valve comprises first and second valve stems; the first valve stem comprises the first valve body; and the second valve stem comprises the second valve body;

said step of extracting the first valve body from the valve comprises extracting the first valve stem from the valve; and
  said step of extracting the second valve body from the valve comprises extracting the second valve stem from the valve.

19. A double valve, said valve comprising:

a valve housing;
a first valve body disposed within said valve housing;
said first valve body comprising at least one first seal;
said first valve body comprising at least one first groove, said at least one groove being configured to receive said at least one seal;
said at least one first seal being disposed in said at least one first groove;
a second valve body disposed within said valve housing;
said second valve body comprising at least one second seal;
said second valve body comprising at least one second groove, said at least one second groove being configured to receive said at least one second seal;
said at least one second seal being disposed in said at least one second groove;
said first valve body and said second valve body being slidably displaceable;
said first valve body and said second valve body being slidably displaceable to provide a closed position and an open position of said valve;
a first valve seat disposed within said valve housing;
said first valve body being disposed to be in contact with said first valve seat in said closed position;
a second valve seat disposed within said valve housing;
said second valve body being disposed to be in contact with said second valve seat in said closed position;
said first valve body having a first flushing position to flush said first valve body;
said first valve body being slidably displaceable between said open position and said first flushing position to flush said first valve body;
said second valve body being slidably displaceable between said closed position and said open position;
said second valve body having a second flushing position to flush said second valve body;
at least one input and at least one output;
said first valve body and said first valve seat and said second valve body and said second valve seat being disposed between said at least one input and said at least one output for permitting flow and stopping flow between said at least one input and said at least one output;
a cavity disposed within said housing;
said cavity being disposed adjacent to said first valve body and adjacent to said second valve body to allow exit of fluid upon the valve being in said first flushing position or said second flushing position;
apparatus to move said first and second valve bodies being configured:

to move said first valve body and said second valve body in a first direction of movement from said closed position to said open position;
  to move said first valve body in a second direction of movement from said closed position to said first flushing position thus freeing said first valve body from said first valve seat, said second direction of movement being substantially opposite to said first direction of movement; and
  to move said second valve body in a third direction of movement from said closed position to said second flushing position thus freeing said second valve body from said second valve seat, said third direction of movement being opposite to said second direction of movement;

said at least one first seal having a first diameter and said at least one second seal having a second diameter;

the first diameter being substantially equal to the second diameter;

one of said first valve body and said second valve body comprising a third seal;

the other of said first valve body and said second valve body comprising a sealing collar;

said third seal being disposed and configured to be in contact with said sealing collar and to seal said cavity when said valve is in said open position;

said first and second valve seats comprising a one-piece valve seat;

said one-piece valve seat comprising an indentation; and said indentation being disposed between said first valve seat and said second valve seat to correspond to and be disposed opposite said third seal upon the valve being in said closed position; and said indentation being configured and disposed to be in fluid communication with said cavity upon the valve being in said closed position.

20. The valve according to claim 19 comprising:

said third seal being disposed between said at least one first seal and said at least one second seal;

said third seal having a third diameter;

the third diameter being substantially equal to both the first diameter and the second diameter;

a first valve stem corresponding to said first valve body;

a second valve stem corresponding to said second valve body;

said at least one first seal, said at least one second seal and said third seal each comprising annular gaskets;

said annular gaskets each comprising a rounded profile, said rounded profile being disposed toward said one-piece valve seat;

each said annular gasket comprising an anchoring shoulder disposed toward its corresponding valve body;

said third seal being disposed on said first valve body;

said first valve body being disposed above said second valve body;

an injection tube;

said injection tube being disposed within said housing;

said injection tube being disposed and configured to supply a cleaning fluid to the valve;

said injection tube being disposed adjacent said lower valve stem;

said injection tube being disposed to provide cleaning fluid toward said first valve body;

said first valve body comprising a plate; and said injection tube being configured and disposed to provide a rotational flow of cleaning fluid adjacent said one-piece valve seat and between said at least one first seal and said at least one second seal.

* * * * *

UNITED STATES PATENT AND TRADEMARK OFFICE
CERTIFICATE OF CORRECTION

| | | |
|---|---|---|
| PATENT NO. | : 6,098,645 | Page 1 of 1 |
| DATED | : August 8, 2000 | |
| INVENTOR(S) | : Wolfgang Brackelmann, Klaus Scholz and Norbert Fischer | |

It is certified that error appears in the above-identified patent and that said Letters Patent is hereby corrected as shown below:

<u>Title page,</u>
Item [56], FOREIGN PATENT DOCUMENTS, after the '0140432' reference, insert the following:

-- 3108778    6/1982    Fed. Rep. of Germany
   8524858    11/1985   Fed. Rep. of Germany
   0174384    3/1986    Europe --.

Signed and Sealed this

Fifth Day of March, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO. : 6,098,645
DATED : August 8, 2000
INVENTOR(S) : Wolfgang Bräckelmann, Klaus Scholz, Norbert Fischer Page 1 of 1

It is certified that error appears in the above-identified patent and that said Letters Patent is hereby corrected as shown below:

<u>Title page,</u>
Item [56], under the FOREIGN PATENT DOCUMENTS section, after the '0140432' reference, insert the following:

| | | |
|---|---|---|
| -- 3108778 | 6/1982 | Fed. Rep. of Germany |
| 8524858 | 11/1985 | Fed. Rep. of Germany |
| 0174384 | 3/1986 | Europe --. |

Signed and Sealed this

Nineteenth Day of March, 2002

Attest:

JAMES E. ROGAN
*Attesting Officer*    *Director of the United States Patent and Trademark Office*